UNITED STATES PATENT OFFICE.

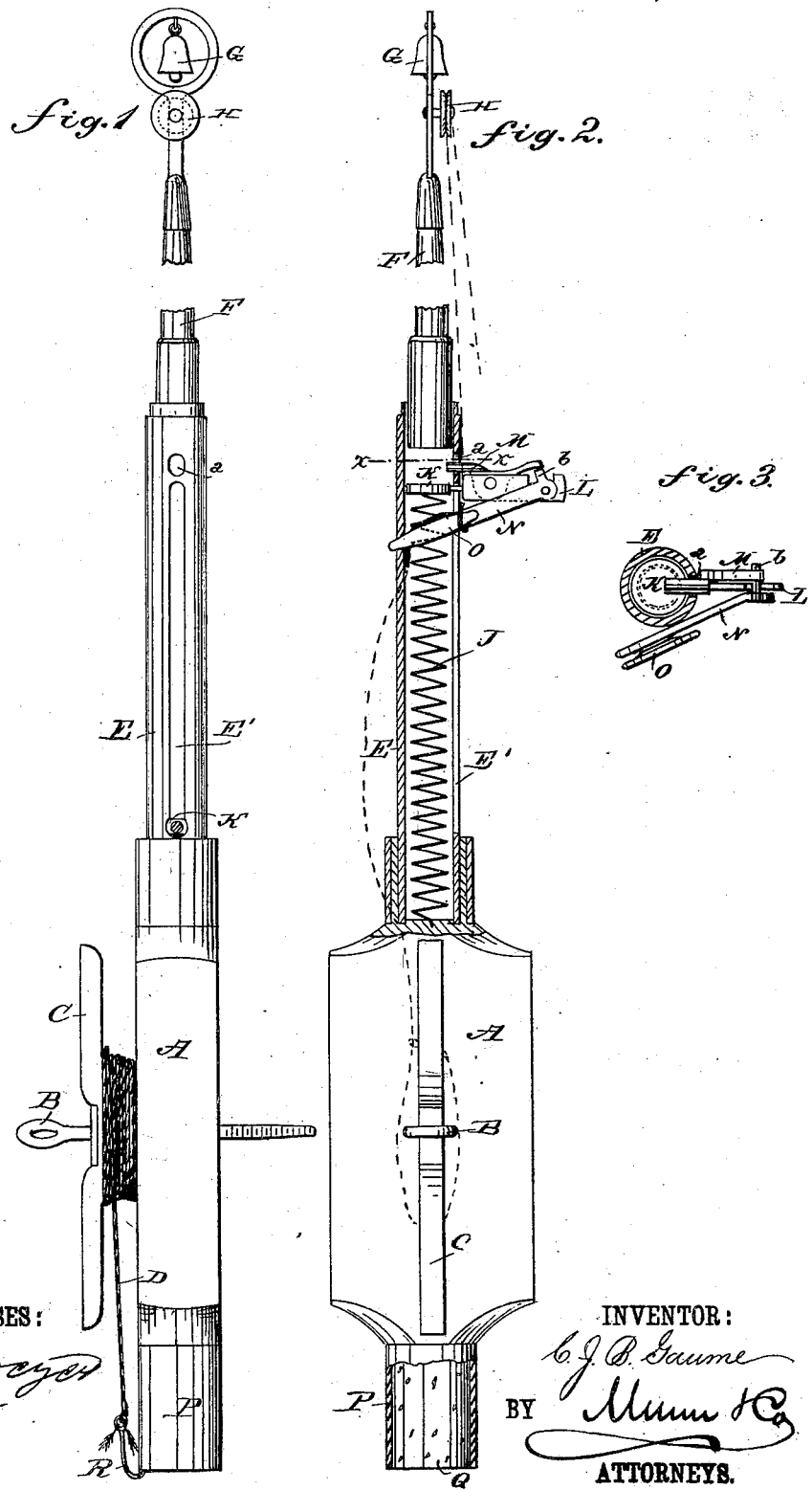

CHARLES J. B. GAUME, OF BROOKLYN, NEW YORK.

FISHING-TACKLE.

SPECIFICATION forming part of Letters Patent No. 272,232, dated February 13, 1883.

Application filed June 14, 1882. (No model.)

*To all whom it may concern:*

Be it known that I, CHARLES J. B. GAUME, of the city of Brooklyn, in the county of Kings and State of New York, have invented a new and Improved Fishing-Tackle, of which the following is a full, clear, and exact description.

The object of my invention is to provide a new and improved fishing-tackle which automatically gives an alarm as soon as the fish nibbles, and which then automatically draws the line suddenly to jerk the hook in the fish's jaw; and to this end the invention consists in the peculiar construction and arrangement of parts, as hereinafter more fully described, and pointed out in the claims.

Reference is to be had to the accompanying drawings, forming part of this specification, in which similar letters of reference indicate corresponding parts in all the figures.

Figure 1 is a longitudinal elevation of my improved fishing-tackle, parts being shown in section. Fig. 2 is a longitudinal sectional elevation of the same. Fig. 3 is a cross-sectional view of the same on the line $x\ x$, Fig. 2.

A block or handle-piece, A, of wood or metal, is provided with a transverse aperture, through which a screw, B, can be passed to hold the block A to a post, beam, &c. A cleat, C, is attached to this block A, and on this cleat the fishing-line D is wound when the same is not being used. In place of the cleat C, a reel or other analogous device may be attached to the block A; or these devices may be dispensed with entirely. A tube, E, projecting upward, is secured on the upper end of the block A, and is provided with a longitudinal slot, E'. The upper end of this tube E forms a socket for the lower end of a rod, F, which must be somewhat flexible, and is to be from ten to eighteen inches long. A bell, G, of any desired construction, is attached to the upper end of this rod, and a pulley, H, is pivoted to this rod near its upper end. A spiral spring, J, which draws downward, is contained in the tube E, and to its upper end a disk, K, is attached, from which an arm, L, projects through the slot E'. An aperture, $a$, is provided in the tube E above the upper end of the slot E'. A latch, M, pivoted to one side of the arm L, has its inner end rounded to adapt it to pass into the aperture $a$. The outer end is adapted to rest on a pintle, $b$, projecting laterally from the outer end of an arm, N, pivoted to the outer end of the arm L, passing to or by the side of the tube E. This pivoted arm N is provided at its swinging end and on its outer surface with a small cleat or catch, O, to which the fishing-line can be fastened. A tubular projection, P, on the bottom of the block A is filled with cork Q, into which the fishing-hooks R are passed when not in use, so that they cannot injure the person.

The operation is as follows: The fishing-line is thrown out into the water and the land end is passed over the pulley H, around the cleat or catch O on the arm N, and is received on the cleat C, the arm L having been previously raised, and the inner end of the latch-lever M passed into the aperture $a$ and the stud $b$ passed under the outer end of the latch-lever M. As soon as a fish touches the hook or the bait on the same, this slight tension on the line will be sufficient to cause the bell at the upper end of the rod F to ring. If the fish nibbles at the bait, the tension on the line will be sufficient to draw the outer end of the arm N upward, and thus release the outer end of the lever M, which will then swing downward with its outer end, thereby causing the inner end to pass out of the aperture $a$. The spring J will then draw the arm L downward very suddenly, and will jerk the line, as the same is attached to this arm L. This jerk on the line pulls the hook into the fish's jaw. As this fishing-tackle gives notice every time a fish nibbles, the fisher need not watch his line continually, and can spend his time in reading, &c.

Having thus fully described my invention, what I claim as new, and desire to secure by Leters Patent, is—

1. In a fishing-tackle, the combination, with the block A, of the slotted tube E, the spring J, the disk K, the arm L, the latch-lever M, and the pivoted arm N, substantially as herein shown and described, and for the purpose set forth.

2. In a fishing-tackle, the combination, with the block A, of the slotted tube E, the spring J therein, the disk K, the arm L, the latch-lever M, the pivoted arm N, provided with a lateral stud, b, and the cleat or catch O on the arm N, substantially as herein shown and described, and for the purpose set forth.

3. In a fishing-tackle, the combination, with the block A, the slotted tube E, the spring J, the disk K, the arm L, the latch-lever M, the pivoted arm N, provided with the catch O, the rod F, provided with the bell G, and the pulley H, substantially as and for the purpose set forth.

CHARLES J. B. GAUME.

Witnesses:
OSCAR F. GUNZ,
C. SEDGWICK.